United States Patent
Wood

(10) Patent No.: US 8,943,591 B2
(45) Date of Patent: *Jan. 27, 2015

(54) METHODS, SYSTEMS, AND COMPUTER PROGRAM PRODUCTS FOR MITIGATING EMAIL ADDRESS HARVEST ATTACKS BY POSITIVELY ACKNOWLEDGING EMAIL TO INVALID EMAIL ADDRESSES

(71) Applicant: AT&T Intellectual Property I, L.P., Reno, NV (US)

(72) Inventor: Stephen K. Wood, Whitehouse St., NJ (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 7 days.

This patent is subject to a terminal disclaimer.

(21) Appl. No.: 13/769,638

(22) Filed: Feb. 18, 2013

(65) Prior Publication Data
US 2013/0160123 A1     Jun. 20, 2013

Related U.S. Application Data

(63) Continuation of application No. 12/635,475, filed on Dec. 10, 2009, now Pat. No. 8,381,291.

(51) Int. Cl.
*H01L 29/06* (2006.01)

(52) U.S. Cl.
CPC ............ *H01L 63/1466* (2013.01); *H01L 51/12* (2013.01); *H01L 63/1441* (2013.01); *H01L 51/28* (2013.01)
USPC ........ 726/23; 726/1; 726/22; 726/24; 726/25; 713/153; 713/154; 713/188; 709/217; 709/219; 709/224; 709/225; 709/238

(58) Field of Classification Search
USPC .................. 726/1, 22–25; 713/153–154, 188; 709/217–229, 238–245
See application file for complete search history.

(56) References Cited

U.S. PATENT DOCUMENTS

| | | | |
|---|---|---|---|
| 6,961,776 B1 | 11/2005 | Buckingham et al. | 709/229 |
| 7,475,118 B2 | 1/2009 | Leiba et al. | 709/206 |
| 7,610,344 B2 | 10/2009 | Mehr et al. | 709/206 |
| 7,756,933 B2 | 7/2010 | Reshef et al. | 709/206 |
| 7,761,567 B2 | 7/2010 | Haverkos | 709/224 |
| 7,849,142 B2 | 12/2010 | Clegg et al. | 709/206 |
| 7,917,593 B1* | 3/2011 | Lee | 709/206 |

(Continued)

OTHER PUBLICATIONS

Mitigating the Tragedy of the Digital Commons: The Problem of Unsolicited Commercial E-Mail by Pavlov et al; Publisher: Communications of the Association for Information Systems; Year: 2005.*

(Continued)

*Primary Examiner* — Madhuri Herzog
(74) *Attorney, Agent, or Firm* — Myers Bigel Sibley & Sajovec, PA

(57) ABSTRACT

A method of detecting and responding to an email address harvest attack at an Internet Service Provider (ISP) email system includes counting a number of failed email address look-ups during a single Simple Mail Transfer Protocol (SMTP) session associated with an originating Internet Protocol (IP) address and responding to the originating IP address with a positive acknowledgement that an otherwise invalid email address exists when the count of the number of failed email address look-ups exceeds a threshold.

17 Claims, 3 Drawing Sheets

(56) References Cited

U.S. PATENT DOCUMENTS

| | | | |
|---|---|---|---|
| 7,953,814 B1 | 5/2011 | Chasin et al. | 709/207 |
| 8,087,082 B2 | 12/2011 | Bloch et al. | 726/22 |
| 8,103,627 B1 | 1/2012 | Qiu et al. | 707/613 |
| 8,171,553 B2 | 5/2012 | Aziz et al. | 726/24 |
| 8,224,905 B2 | 7/2012 | Bocharov et al. | 709/206 |
| 8,244,799 B1 | 8/2012 | Salusky et al. | 709/203 |
| 8,601,064 B1 * | 12/2013 | Liao et al. | 709/206 |
| 2003/0172145 A1 | 9/2003 | Nguyen | 709/223 |
| 2006/0031359 A1 | 2/2006 | Clegg et al. | 709/206 |
| 2006/0059238 A1 | 3/2006 | Slater et al. | 709/206 |
| 2006/0168202 A1 | 7/2006 | Reshef et al. | 709/224 |
| 2007/0204341 A1 | 8/2007 | Rand et al. | 726/22 |
| 2007/0250644 A1 | 10/2007 | Lund et al. | 709/245 |
| 2008/0120413 A1 | 5/2008 | Mody et al. | 709/226 |
| 2008/0275916 A1 | 11/2008 | Bohannon | 707/200 |
| 2009/0089877 A1 | 4/2009 | Bolinger et al. | 726/22 |
| 2009/0172162 A1 | 7/2009 | Wood | 709/226 |
| 2009/0187976 A1 | 7/2009 | Perroud et al. | 726/4 |
| 2010/0004011 A1 | 1/2010 | Sweatman et al. | 455/466 |
| 2011/0149979 A1 | 6/2011 | Uttaro et al. | 370/401 |

OTHER PUBLICATIONS

Reducing the Effect of Distributed Directory Harvest Attack and Load of Mail Server by Das et al; Publisher: IEEE; Year: 2008.*

Efficient directory harvest attacks .This paper appears in: Collaborative Technologies and Systems, 2005. Proceedings of the 2005 International Symposium on Date of Conference: May 20-20, 2005 Author(s): Vajda, B.B.I.

* cited by examiner

METHODS, SYSTEMS, AND COMPUTER PROGRAM PRODUCTS FOR MITIGATING EMAIL ADDRESS HARVEST ATTACKS BY POSITIVELY ACKNOWLEDGING EMAIL TO INVALID EMAIL ADDRESSES

RELATED APPLICATION

This application is a continuation of U.S. application Ser. No. 12/635,475, filed Dec. 10, 2009, the disclosure of which is hereby incorporated herein by reference as if set forth in its entirety.

BACKGROUND

The present disclosure relates generally to communication networks, and, more particularly, to methods, systems, and computer program products for detecting and responding to email address harvest attacks and associated spam attacks.

The present disclosure relates generally to communication networks, and, more particularly, to methods, systems, and computer program products for detecting and responding to email address harvest attacks and associated spam attacks.

Email address harvesting is generally defined as a means of obtaining a list of valid email addresses associated with email domains with the purpose of using this list to address spam messages. An email address harvest attack is when a spammer attempts to obtain an email address list by connecting, via Simple Mail Transfer Protocol (SMTP), to an email domain and using an automated dictionary-name type of attack to check whether the email domain will accept delivery of email for a list of email addresses. Via trial and error, the spammer collects a list of valid email addresses. These attacks may be used to build initial lists as well as to refine and maintain existing harvested lists. Lists can also be obtained by purchasing them from other spammers or by systematic indexing web pages to obtain imbedded email addresses.

Each day thousands of SMTP mail systems controlled by spammers connect or attempt to connect to large Internet Service Providers (ISPs) to harvest email addresses. Some of the spammers just connect to the ISP domain, provide a list of "To" addresses, get the responses from the ISP, and disconnect. While other spammers connect, provide a list of "To" addresses, get responses, supply a message(s) to be delivered to the valid addresses, and disconnect. This sending of email may be used to obfuscate the attack or to get around defenses that the ISP domain has deployed to stop harvest attacks. In general, the ISPs accept the connections, validate the addresses submitted, and deliver the email, without knowing that a harvest attack has occurred. Also, harvest attacks may go unnoticed because ISPs are not focusing on them, and it is very hard to differentiate it from valid mail sessions.

ISPs, which focus on mitigating harvest attacks, typically focus their efforts first on trying to determine that a harvest attack is occurring. ISPs may do this by counting the number of failed address lookups during a SMTP session or the percent of failed address lookups during a session, and if the number surpasses the configured threshold, then a harvest attack is determined to be occurring. Also, sometimes a number and a percentage are jointly used to establish minimum thresholds. The thresholds may be kept high to reduce false positives that can occur when legitimate marketers send to address lists that may be out of date. As a result of the determination that a harvest attack is occurring, the SMTP session is dropped. ISPs may also attempt to block harvester mail systems by blocking the Internet Protocol (IP) addresses of the mail system of suspected harvesters. ISPs either obtain a harvest blacklist from a vendor, or they compile their own by analyzing "failed address lookups" across all SMTP sessions, arriving at a reputation for each mail system and establishing thresholds to be used to determine whether a particular mail system's IP address should be added to the harvest blacklist. To be effective at blocking future harvest attacks, the harvest block list may block connection attempts upfront prior to allowing responses from email address lookups. In many cases, the IP address blacklists that are used to block mail systems that are spamming are also used to block harvest attacks.

More specifically, the operation of the blocking and session dropping may be as follows: When an originating mail system attempts to connect, the originating IP address is checked against the harvest blacklist. If the IP address is on the harvest blacklist, the connection is rejected. If the connection is accepted, the SMTP session is begun, with the initial salutation (Ehlo/Helo) and the sender address (Mail From:) followed by the recipient addresses (RCPT To:) SMTP commands. As a recipient address is submitted, an address lookup is done to check whether the recipient address is valid. If the address is valid, the recipient mail system provides a valid response. If the address is invalid, the system recipient mail system provides an invalid response. The recipient mail system then counts the number of failed address lookups during the session and if the count does surpass the harvest attack threshold, the connection is dropped. If the count does not surpass the harvest attack threshold, the connection remains up awaiting the originating mail system to issue a disconnect request, or to accept a message and a disconnect request, or timeout.

A problem with such solutions is that spammers may easily execute harvest attacks that get past blacklists or failed address lookup thresholds. They may send from a vast number of different IP addresses that have no reputation and they may limit their failed address lookup attempts to keep under the threshold the ISP has established. They may modify their limits if they determine that the ISP has modified their thresholds. Also, spammers may include a simple message as part of their harvest attack so as to blend in with normal message traffic. Spammers may also send from as many different IP addresses to generate as much volume of lookups as needed to complete their desired level of maintenance of their harvest lists. If some of their harvest attack sessions are dropped or their IP addresses are blocked from executing a harvest attack, spammers may just execute additional harvest attacks till they reach the desired level. From experience, it appears that spammers establish levels based on a daily basis (e.g. check X addresses per day, or check Y successful address lookups per day). As a result, ISPs may constantly update their blacklists with the hope that it will mitigate the next attack. ISPs typically do not modify their thresholds often because in many cases it may result in bringing down the mail application to update the configuration, which may causes availability or resource constraints. Moreover, lowering the thresholds may cause false positives and associated complaint calls. Given that many of the harvest attacks are used to refine or maintain already harvested lists, these attacks may not identified because during these attacks many addresses are valid and the number of failed address lookups are normally below the threshold an ISP would set for determining that a harvest attack is occurring.

The effectiveness of current harvest mitigation techniques may be limited because it is generally very hard to mitigate attacks after the fact. Over the last several years, a larger and larger proportion of an ISP's email addresses may have been harvested. It is common for large ISPs to receive harvest attacks that check millions of addresses each day for spammers to add new addresses of new accounts and remove old addresses whose accounts are no longer active. Once addresses are harvested, they are typically then used in spam attacks. As a result, it has gotten to the point, where sometimes upwards of 100% of all addresses used in a large spam attack, which may be addressed to tens of millions of recipients, are valid. Spammers are continuously trying to obtain a higher proportion of valid addresses for a particular domain.

As a result of being unsure of the sender's identity, the lack of reputation, the inability to identify harvest attacks, and spammers' effectiveness of obfuscation these attacks, ISPs have generally had a hard time of improving the effectiveness of their current email address harvest mitigation processes. As a consequence, many email address harvest attacks go along unnoticed, unabated, and directly support spammers' ability to increase delivery of spam into ISP members' mailboxes and adversely affect their experience with using email. In addition, from an ISP's prospective, email address harvest attacks have greatly affected the cost of providing email service.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the disclosure.

Some embodiments provide a method of detecting and responding to an email address harvest attack at an Internet Service Provider (ISP) email system comprising counting a number of failed email address look-ups during a single Simple Mail Transfer Protocol (SMTP) session associated with an originating Internet Protocol (IP) address and responding to the originating IP address with a positive acknowledgement that an otherwise invalid email address exists when the count of the number of failed email address look-ups exceeds a threshold.

In other embodiments, responding to the originating IP address with the positive acknowledgement comprises responding to the originating IP address with the positive acknowledgement that the otherwise invalid email address exists at a response percentage rate for subsequent failed email address look-ups responsive to the number of failed email address lookups exceeding the threshold.

In still other embodiments, the method further comprises defining a plurality of email system categories ranging from a least likely to engage in an email address harvest attack to a most likely to engage in an email address harvest attack, determining which of the plurality of email system categories the originating IP address is associated with, and setting the threshold and the response percentage rate based on the determined email system category associated with the originating IP address.

In still other embodiments, the threshold is less for the email system categories more likely to engage in an email address harvest attack than the threshold is for the email system categories less likely to engage in an email address harvest attack and wherein the response percentage rate is greater for the email system categories more likely to engage in an email address harvest attack than the response percentage rate is for the email system categories less likely to engage in an email address harvest attack.

In still other embodiments, the method further comprises creating a fake email inbox for each otherwise invalid email address responded to with a positive acknowledgement, each fake email inbox having a spam folder associated therewith, and processing email addressed to each fake email inbox using a spam filter.

In still other embodiments, the method further comprises storing email addressed to each fake email inbox in the fake email inbox when the email is not determined to be spam by the spam filter and storing email addressed to each fake email inbox in the respective spam folder associated therewith that is determined to be spam by the spam folder.

In still other embodiments, the method further comprises generating a new spam filtering signature as a result of processing email stored in each fake email inbox, applying the new spam filtering signature to email directed to valid email addresses on the ISP email system, and moving any email directed to valid email addresses on the ISP email system and determined to be spam due to application of the new spam filtering signature to respective spam folders associated with the valid email addresses.

In still other embodiments, the method further comprises maintaining a count of email addressed to all fake email inboxes for the originating IP address, determining if the count of email addressed to all fake email inboxes for the originating IP address exceeds a spam blocking threshold, and blocking all communication traffic from the originating IP address when the count of email addressed to all fake email inboxes for the originating IP address exceeds a spam blocking threshold.

In still other embodiments, the method further comprises processing email addressed to each fake email inbox using a virus filter.

In still other embodiments, the method further comprises calculating a spam filtration rate for each fake email inbox by dividing a count of a number of email messages in the spam folder by a sum of the count of the number of email messages in the spam folder and a count of a number of messages in the associated fake email inbox.

In further embodiments, an Internet Service Provider (ISP) email system for detecting and responding to an email address harvest attack comprises a data processing system configured to count a number of failed email address look-ups during a single Simple Mail Transfer Protocol (SMTP) session associated with an originating Internet Protocol (IP) address and to respond to the originating IP address with a positive acknowledgement that an otherwise invalid email address exists when the count of the number of failed email address look-ups exceeds a threshold.

In still further embodiments, the data processing system is further configured to respond to the originating IP address with the positive acknowledgement that the otherwise invalid email address exists at a response percentage rate for subsequent failed email address look-ups responsive to the number of failed email address lookups exceeding the threshold.

In still further embodiments, the data processing system is further configured to define a plurality of email system categories ranging from a least likely to engage in an email address harvest attack to a most likely to engage in an email address harvest attack, to determine which of the plurality of email system categories the originating IP address is associated with, and to set the threshold and the response percentage rate based on the determined email system category associated with the originating IP address.

In still further embodiments, the threshold is less for the email system categories more likely to engage in an email address harvest attack than the threshold is for the email system categories less likely to engage in an email address harvest attack and wherein the response percentage rate is greater for the email system categories more likely to engage in an email address harvest attack than the response percentage rate is for the email system categories less likely to engage in an email address harvest attack.

In still further embodiments, the data processing system is further configured to create a fake email inbox for each otherwise invalid email address responded to with a positive acknowledgement, each fake email inbox having a spam folder associated therewith, to process email addressed to each fake email inbox using a spam filter, to store email addressed to each fake email inbox in the fake email inbox when the email is not determined to be spam by the spam filter, and to store email addressed to each fake email inbox in the respective spam folder associated therewith that is determined to be spam by the spam folder.

In other embodiments, a computer program product for detecting and responding to an email address harvest attack comprises a computer readable storage medium having computer readable program code embodied therein. The computer readable program code comprises computer readable program code configured to count a number of failed email address look-ups during a single Simple Mail Transfer Protocol (SMTP) session associated with an originating Internet Protocol (IP) address and computer readable program code configured to respond to the originating IP address with a positive acknowledgement that an otherwise invalid email address exists when the count of the number of failed email address look-ups exceeds a threshold.

In still other embodiments, the computer program product further comprises computer readable program code configured to respond to the originating IP address with the positive acknowledgement that the otherwise invalid email address exists at a response percentage rate for subsequent failed email address look-ups responsive to the number of failed email address lookups exceeding the threshold.

In still other embodiments, the computer program product further comprises computer readable program code configured to define a plurality of email system categories ranging from a least likely to engage in an email address harvest attack to a most likely to engage in an email address harvest attack, computer readable program code configured to determine which of the plurality of email system categories the originating IP address is associated with, and computer readable program code configured to set the threshold and the response percentage rate based on the determined email system category associated with the originating IP address.

In still other embodiments, the threshold is less for the email system categories more likely to engage in an email address harvest attack than the threshold is for the email system categories less likely to engage in an email address harvest attack and wherein the response percentage rate is greater for the email system categories more likely to engage in an email address harvest attack than the response percentage rate is for the email system categories less likely to engage in an email address harvest attack.

In still other embodiments, the computer program product further comprises computer readable program code configured to create a fake email inbox for each otherwise invalid email address responded to with a positive acknowledgement, each fake email inbox having a spam folder associated therewith, computer readable program code configured to process email addressed to each fake email inbox using a spam filter, computer readable program code configured to store email addressed to each fake email inbox in the fake email inbox when the email is not determined to be spam by the spam filter, and computer readable program code configured to store email addressed to each fake email inbox in the respective spam folder associated therewith that is determined to be spam by the spam folder Other methods, systems, devices, appliances, and/or computer program products according to embodiments of the invention will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Other features of exemplary embodiments will be more readily understood from the following detailed description of specific embodiments thereof when read in conjunction with the accompanying drawings, in which.

DETAILED DESCRIPTION

Figure 1:
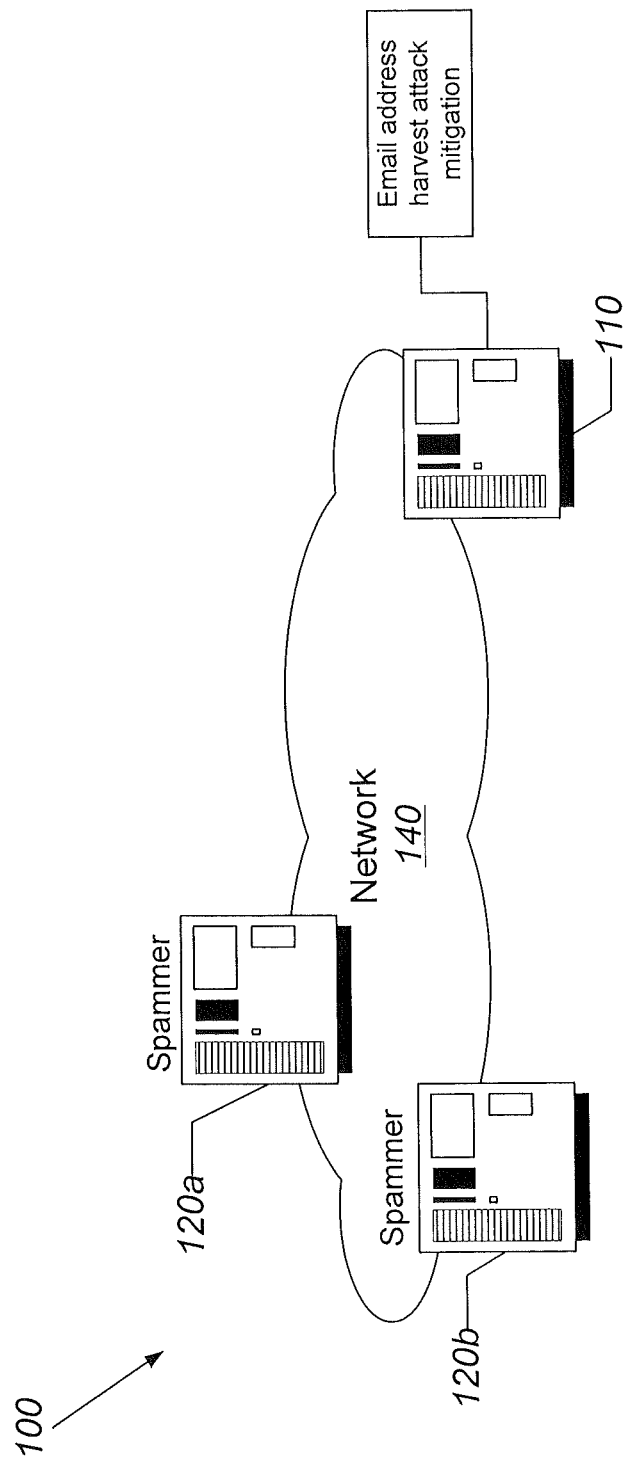
FIG. 1 is a block diagram that illustrates a communication network that includes an Internet Service Provider (ISP) server that is configured to mitigate email address harvest attacks and associated spam attacks according to some embodiments.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It should be further understood that the terms "comprises" and/or "comprising" when used in this specification is taken to specify the presence of stated features, integers, steps, operations, elements, and/or components, but does not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Exemplary embodiments may be embodied as methods, systems, and/or computer program products. Accordingly, exemplary embodiments may be embodied in hardware and/or in software (including firmware, resident software, microcode, etc.). Furthermore, exemplary embodiments may take the form of a computer program product comprising a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Spammers need targets for their spam, resources to deliver it, and a consumer market that would consider purchasing their products. Some embodiments for mitigating email address harvest attacks and associated spam focuses on the need for "targets." Targets are obtained by harvesting the email addresses. Without targets there would be no spam. To obtain maximum selling potential, spammers send spam to millions of user email addresses on a vast number of Internet Service Providers (ISPs). As a result, spammers have to harvest and maintain a harvest list that contains millions to tens of millions of email addresses. Just like spamming, each day a spammer sets objectives of the volume of lookups needed to complete their desired level of maintenance of their harvest lists. Spammers then execute harvest attacks to meet their objectives. If they are blocked or connections are dropped, they will continue to execute more harvest attacks until they meet their objective or the day ends.

Some embodiments for mitigating harvest attacks and associated spam attacks focus on using a different mitigation technique upon determining that a harvest attack is being executed. Instead of dropping the connection upon determination, misinformation is provided in response to "failed address lookups." If the spammer inputs another recipient address after it has been determined that a harvest attack is in progress, the ISP mail system does a lookup to see if the recipient address exists and is active and the address is invalid, the ISP mail system will first respond back to the spammer with a positive acknowledgement that the address exists and is active as it would normally respond to a valid address. As a result of this action, the spammer will update their harvest list with an invalid address. If the spammer continues to input more invalid addresses, the ISP mail system will check the configuration to see if it should provide a valid response to all failed lookup requests during the session or provide a valid response every X times (e.g. every failed lookup, every second failed lookup, etc.). Over time, an increasingly higher percent of addresses on the spammer's address list will contain fake or "honeypot" email addresses. The goal is to have so many fake or "honeypot" accounts (e.g. upwards of 90% of all email addresses) so as to obfuscate the true targets. This can be controlled by monitoring the number of fake or "honeypot" accounts that are being created and by modifying the configuration to increase or decrease the creation rate of "honeypot" accounts.

From experience, it appears that most spammers establish attack levels for harvest attacks. So it is expected that spammers will always reach their harvest attack goals (e.g. check X addresses per day, or check Y successful address lookups per day) and, once reached, the spammer will stop the harvest attack. With each passing harvest attack, a spammer may think that the harvest goal has been reached and stop the harvest attack, but in reality the spammer is falling increasingly short of the harvest goal because more and more email addresses on the list is invalid.

Secondly, the ISP mail system may create a fake or "honeypot" email address mailbox for each of the failed address lookup(s) that it responded back with a positive response. If during the session the spammer supplies a message to be delivered it will be placed into this fake or "honeypot" email address mailbox. This mailbox may be configured to check the email for spam and virus filtering. If the message is determined to be spam or a virus, it may be placed in a Spam/Virus folder. Otherwise, the message may be placed in the Inbox. All subsequent address lookups requests or message delivery requests to this fake or "honeypot" email address will receive a positive acknowledgement and will be treated as any other valid and active mailbox. Over time, an increasingly higher percent of spam that is sent may be deposited in fake or "honeypot" email address mailboxes.

From experience it appears that most spammers establish attack levels for spam attacks (X spam messages got past blocking per day, Y spam messages got past filtering per day). Spammers can easily and automatically monitor the blocking error codes returned on each spam attack and count the number of successful attacks and then continue sending till they reach their desired levels. Additionally, some spammers have deployed their own "honeypot" accounts on the target ISP services. Many times these accounts are created with stolen credit cards or the spammer signs up for free email accounts that the ISP offers. Spammers can easily and automatically monitor these spammer "honeypot" mailboxes for each attack to see if their spam messages are getting by the filters. So it is expected that spammers will typically always reach their spam attack goals (e.g. X messages got past blocking per day, or Y spam messages got past filtering per day) and, once reached, a spammer will stop the spam attack. With each passing harvest attack, the spammers will think they reached their spam goals and stop their spam attacks, but in reality they are increasingly falling short of their spam goals because more and more of the email addresses on their email lists, who are the targets of their spam attacks, are invalid.

It is generally beneficial that spammers do not realize that an obfuscated email address harvesting mitigation strategy is being used. According to some embodiments, all system responses and processing may be performed in exactly the same way as is currently done for valid email addresses and associated mailboxes.

In some embodiments, the ISP mail system analyzes all messages that arrive in the fake or "honeypot" mailboxes. In theory, all mail deposited in these mailboxes is spam because they each were created in response to a spammer during an email address harvest attack, the spammer is the only one who knows the address, and the mailboxes would not otherwise receive any email. Each message will be fed back into the filtering system to create new spam filtering signatures according to some embodiments. If this message is determined to be spam as a result of a new spam filtering signature, the message identifier will be obtained from the message header and will be used to obtain all copies of the message that were just sent to other recipients on the ISP mail system. If these messages haven't been delivered to the users' local mailboxes, then they will be reclassified as spam and placed in respective spam folders. Additionally, the originating Internet Protocol (IP) address may be obtained from the message header, the count of messages sent to fake or "honeypot" accounts for that IP address is incremented, and the IP address message counts can be checked against the IP address spam blocking threshold. If the blocking threshold is surpassed, then the IP address may be added to the Realtime Block List (RBL) and all future traffic from that IP address may be blocked. In some embodiments, the thresholds may not be too restricted so to limit false positives as well as to improve the effectiveness of email address harvesting mitigation techniques according to some embodiments. Also, it is generally desirable not to alert spammers that new email address harvesting mitigation techniques according to some embodiments, which decrease the effectiveness of each successive harvesting attack and all subsequent spam attacks, is being used.

All fake or "honeypot" email address mailboxes, which were created as a result of mitigation of email address harvest attacks, may be scanned to count the number of messages deposited in the Inbox and the number of messages deposited in the Spam folder. An estimate of the spam filtration rate may be determined by dividing the number of messages in the Spam folder by the total number of messages in the Inbox and spam folders. The number of fake or "honeypot" email address mailboxes that are created may be monitored, the creation rate may be controlled, and stale or non-effective accounts will be removed.

All future successful directory lookup attempts for fake or "honeypot" email address mailboxes may be logged. The number of attempts and the originating IP address may be captured for future correlation analysis. The originating IP address of all email messages deposited in each fake or "honeypot" mailbox, whether as part of the initial harvest attack that caused the creation of the mailbox or a subsequent spam attack, may be captured for future correlation analysis.

Referring now to FIG. 1, a communication network 100 that includes an ISP server 110 that is configured to mitigate email address harvest attacks according to some embodiments will now be described. The ISP server 110 may provide email service, Internet access service, media file storage service, and the like to their customers. As discussed above, spammers 120a and 120b may launch email address harvest attacks on the ISP server 110 to acquire valid email addresses as targets for sending out their spam. The ISP server 110 may be configured to mitigate the effectiveness of these email address harvest attacks by detecting such attacks by counting a number of failed email address look-ups during a Simple Mail Transfer Protocol (SMTP) session with an originating IP address. If the number of failed look-ups exceeds a threshold, then the ISP server 110 responds with a positive acknowledgement for an otherwise invalid email address. In this way, the spammers 120a and 120b collect new target email addresses for their spam that are in fact fake addresses not associated with any actual customer. The spammers 120a and 120b believe that they are collecting their desired quotas of new email addresses to send their spam to, but are in fact collecting numerous fake email addresses. As a result, the spammers 120a and 120b may discontinue their attempts to collect even more email addresses as they may believe that they already have collected a sufficient number for their spamming purposes.

In accordance with various embodiments, the network 140 may represent a global network, such as the Internet, or other publicly accessible network. The network 140 may also, however, represent a wide area network, a local area network, an Intranet, or other private network, which may not accessible by the general public. Furthermore, the network 140 may represent a combination of public and private networks or a virtual private network (VPN).

Although FIG. 1 illustrates an exemplary communication network, it will be understood that the present invention is not limited to such configurations, but is intended to encompass any configuration capable of carrying out the operations described herein.

Figure 2:
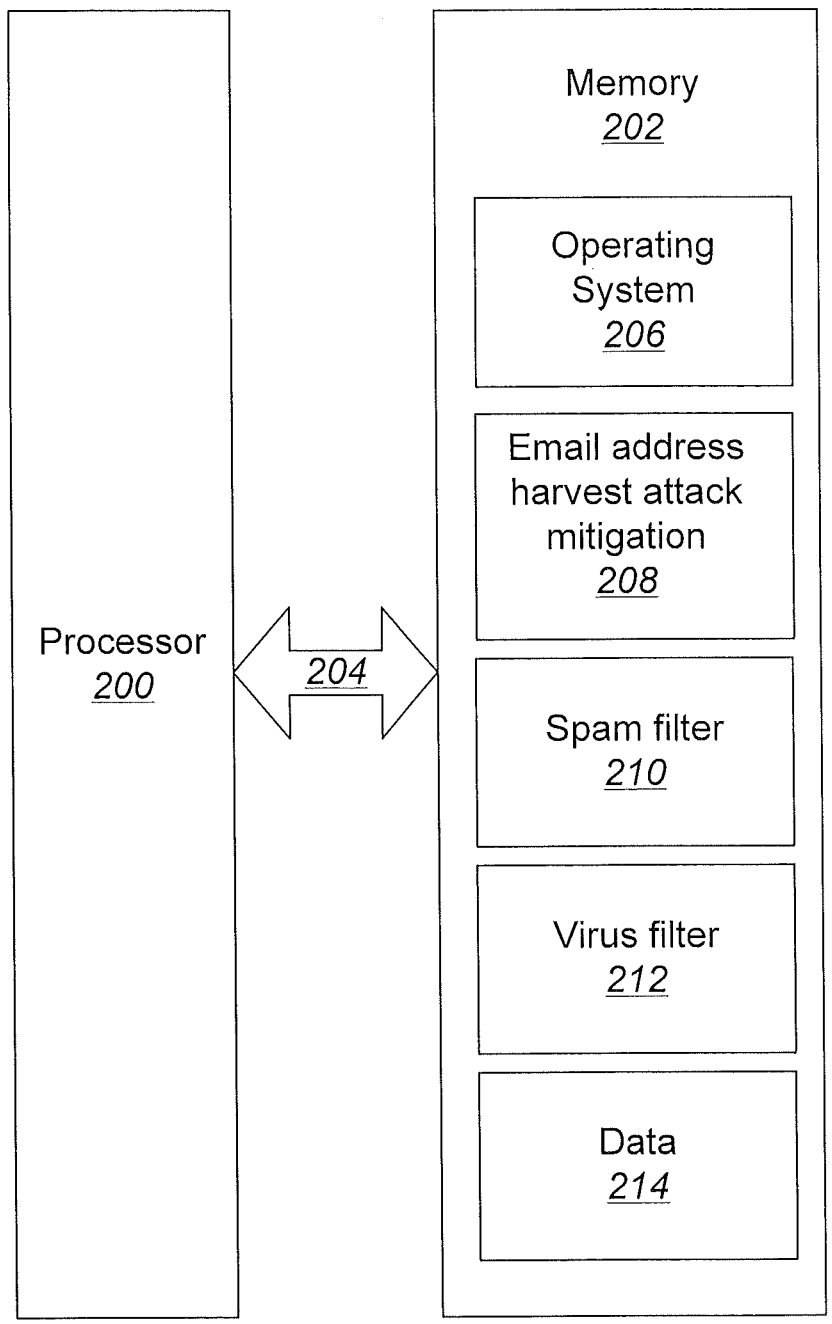
FIG. 2 is a block diagram that illustrates a software/hardware architecture for an ISP server configured to mitigate email address harvest attacks and associated spam attacks according to some embodiments.

FIG. 2 illustrates a processor 200 and memory 202 that may be used in embodiments of ISP servers, such as the ISP server 110 of FIG. 1, for mitigating email address harvest attacks and associated spam attacks. The processor 200 communicates with the memory 202 via an address/data bus 204. The processor 200 may be, for example, a commercially available or custom microprocessor. The memory 202 is representative of the one or more memory devices containing the software and data used to mitigate email address harvest attacks and associated spam attacks in accordance with some embodiments. The memory 202 may include, but is not limited to, the following types of devices: cache, ROM, PROM, EPROM, EEPROM, flash, SRAM, and DRAM.

As shown in FIG. 2, the memory 202 may contain up to five or more categories of software and/or data: an operating system(s) 206, an email address harvest attack mitigation module 208, a spam filter module 210, a virus filter module 212, and a data module 214. The operating system 206 generally controls the operation of the data processing system. In particular, the operating system 206 may manage the data processing system's software and/or hardware resources and may coordinate execution of programs by the processor 200. The email address harvest attack mitigation module 208 may be configured to detect an email address harvest attack and respond to such an attack with positive acknowledgements for otherwise invalid email addresses to deceive the attacker that valid customer email addresses have been obtained. This may result in spammers collecting fewer valid email addresses than they otherwise would because they are tricked into believing that they have collected their quota of valid email address when in fact many of the email addresses that they have collected are fake and not associated with any actual customer.

The spam filter module 210 may be configured to process incoming email to determine if the email is spam and, if it is so determined, to place such email in spam folders respectively associated with the email addresses to which the spam emails are sent. The virus filter module 212 may be configured to process incoming email to determine if the email contains one or more viruses and, if it is so determined, to place such email in quarantine folders respectively associated with the email addresses to which the virus containing emails were sent or otherwise render the virus containing emails harmless.

The data module 214 represents the various data, such as counts, thresholds, calculations, and the like used by the email address harvest attack mitigation module 208, the spam filter module 210, and/or the virus filter module 212 in detecting and responding to email address harvest attacks.

Although FIG. 2 illustrates exemplary hardware/software architectures that may be used in data processing systems, such as the ISP server 110 shown in FIG. 1, for mitigating email address harvest attacks and associated spam attacks, it will be understood that the present invention is not limited to such a configuration but is intended to encompass any configuration capable of carrying out operations described herein. Moreover, the functionality of the ISP server 110 and the hardware/software architecture of FIG. 2 may be implemented as a single processor system, a multi-processor system, or even a network of stand-alone computer systems, in accordance with various embodiments of the present invention.

Computer program code for carrying out operations of data processing systems discussed above with respect to FIGS. 1 and 2 may be written in a high-level programming language, such as Java, C, and/or C++, for development convenience. In addition, computer program code for carrying out operations of the present invention may also be written in other programming languages, such as, but not limited to, interpreted languages. Some modules or routines may be written in assembly language or even micro-code to enhance performance and/or memory usage. Embodiments described herein, however, are not limited to any particular programming language. It will be further appreciated that the functionality of any or all of the program modules may also be implemented using discrete hardware components, one or more application specific integrated circuits (ASICs), or a programmed digital signal processor or microcontroller.

Exemplary embodiments are described herein with reference to flowchart and/or block diagram illustrations of methods, systems, and computer program products in accordance with exemplary embodiments. These flowchart and/or block diagrams further illustrate exemplary operations for mitigating email address harvest attacks and associated spam attacks, in accordance with some embodiments. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means and/or circuits for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Figure 3:
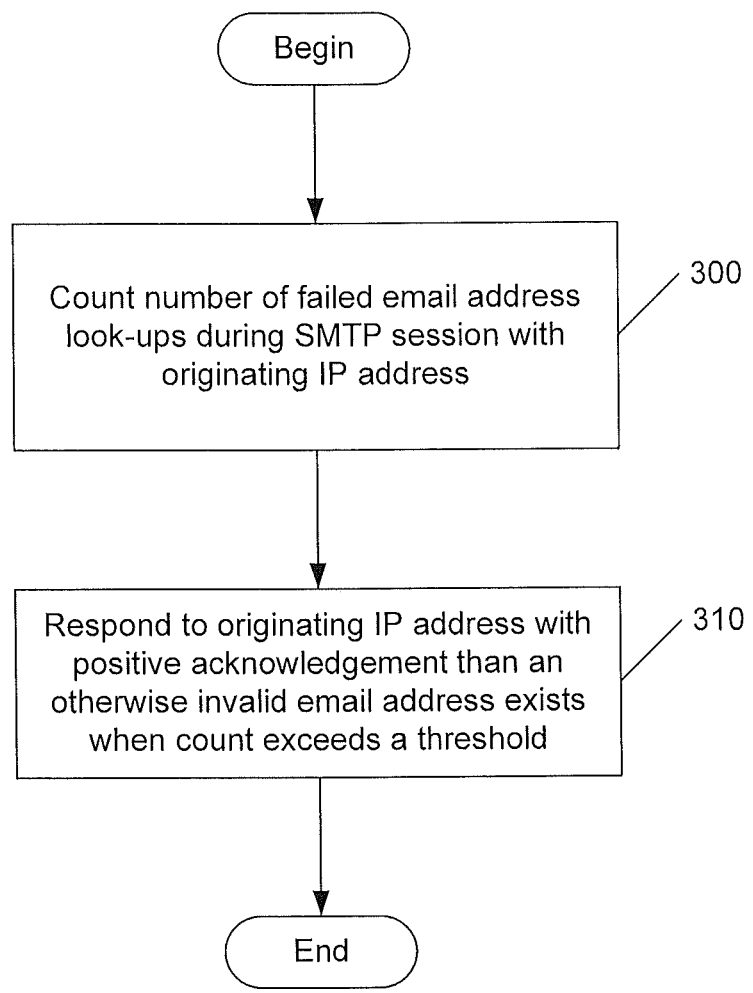
FIG. 3 is a flowchart that illustrates operations for mitigating email address harvest attacks and associated spam attacks according to some embodiments.

Referring now to FIG. 3, exemplary operations for mitigating email address harvest attacks and associated spam attacks begin at block 300 where the ISP server under an email address harvest attack (e.g., ISP server 110 of FIG. 1) counts the number of failed email address look-ups during a single SMTP session associated with an originating IP address, e.g., a spammers IP address. The ISP server responds to the originating IP address, e.g., the spammer launching the email address harvest attack, with a positive acknowledgement that an otherwise valid email address exists when the count of the number of failed email address look-ups exceeds a threshold at block 310.

In some embodiments, the ISP server harvest attack mitigation module 208 may support individual email address harvest attack parameters for particular "categories" of mail systems that the originating IP address has been assigned. For "Friendly" mail systems the email address harvest parameters may be relaxed. For "Uncertain" mail systems the email address harvest parameters may be stronger, and for "Potentially Dangerous" mail systems the email address harvest parameters may be strongest. For example, a "harvest_attack" threshold parameter for "Uncertain" mail systems could be set to 4 failed directory lookups in 1 SMTP session will be considered as an email address harvest attack. An "attack_backoff" parameter may be set to 2 (i.e., provide a valid response to the originating IP address every other time to failed directory lookups after it has been determined that an email address harvest attack is being executed). During SMTP session establishment, the IP address of the originating mail system may be used to decide the mail system category and the associated configuration file.

In some embodiments, if the originating IP address is whitelisted for email address harvesting attacks, then the email address harvest attack mitigation process may be disabled for the whitelisted IP address. If not, then the ISP server harvest attack mitigation module 208 may count the number of failed directory lookups during the session for the particular originating IP address. Misformatted directory lookup addresses entries may receive the current misformatted address error and not be included in the failed directory lookup count. As per the above example, upon receiving the 4$^{th}$ failed directory lookup during the session, the ISP server harvest attack mitigation module 208 may respond with a positive acknowledgement that the email address exists and is active as it would normally respond to a valid email address. The registration database may be updated with the new email address and a fake or "honeypot" mailbox may be created. This "honeypot" mailbox may be configured such that all filter identified spam is placed into an associated Spam folder and will not allow login from users. Also, this fake or "honeypot" mailbox may be set up to forward all email to the spam filter module 210 to create new spam filtering signatures. Additional new email addresses and associated fake or "honeypot" mailboxes will be created for every second failed lookup during that session.

In some embodiments, if a message is supplied as part of the email address harvest attack session, then it may be passed off to the spam and virus filtering modules 210 and 212. Filtering verdicts are returned and the message will be placed, as appropriate, in the spam folder of the fake or "honeypot" email address mailbox. If the message is determined to contain a virus, then the message may be quarantined or otherwise rendered harmless to the ISP email system.

In some embodiments, if a "honeypot" email message is determined to be spam as a result of a new spam filtering signature, the message identifier may be obtained from the message header and may be used to obtain all copies of the message that have been sent to other recipients on the ISP mail system. If these messages haven't been delivered to the respective local mailboxes of the other users, then the messages may be reclassified as spam and placed in the users' respective spam folders.

The originating IP address may be obtained from the message header of messages delivered to fake or "honeypot" accounts. The count of messages sent to "honeypot" accounts for that originating IP address may be monitored, and the IP message counts may be checked against an IP spam blocking threshold. If the blocking threshold is surpassed then the originating IP address may be added the Realtime Block List (RBL) and all future traffic from that originating IP address may be blocked according to some embodiments.

All fake or "honeypot" email address mailboxes, which were created as a result of mitigation of email address harvest attacks, may be scanned to count the number of messages deposited in the Inbox and the number of messages deposited in the associated spam folder. An estimate of the spam filtration rate may be determined by dividing the number of messages in the spam folder by the total number of messages in the Inbox and spam folders according to some embodiments.

All subsequent successful directory lookup attempts for fake or "honeypot" email address mailboxes may be logged. The number of attempts and the originating IP address may be captured for correlation analysis. The originating IP address of all email messages deposited in each fake or "honeypot" mailbox, whether as part of the initial email address harvest attack that created the mailbox or subsequent spam attacks, may be captured for future correlation analysis according to some embodiments.

The flowchart of FIG. 3 illustrates the architecture, functionality, and operations of some embodiments of methods, systems, and computer program products for mitigating email address harvest attacks and associated spam attacks. In this regard, each block represents a module, segment, or portion of code, which comprises one or more executable instructions for implementing the specified logical function(s). It should also be noted that in other implementations, the function(s) noted in the blocks may occur out of the order noted in FIG. 3. For example, two blocks shown in succession may, in fact, be executed substantially concurrently or the blocks may sometimes be executed in the reverse order, depending on the functionality involved.

Spammers need targets for their spam. Without targets there would be no spam. Some embodiments described herein focus on the need for targets by poisoning a spammer's email address list with so many fake or "honeypot" email addresses so as to reduce the effectiveness of the harvested email address lists and associated spam attacks that are based on the lists.

According to some embodiments, spammers may unknowingly be failing to reach their spam goals because more and more of the email address targets of their spam attacks are invalid. Thus, some embodiments may reduce the effectiveness of email address harvest attacks and reduce the amount of spam that is delivered to an ISP's customers' mailboxes, which may improve customer satisfaction. In addition, from an ISP Service prospective, the cost of providing email service may be reduced.

Many variations and modifications can be made to the preferred embodiments without substantially departing from the principles of the present invention. All such variations and modifications are intended to be included herein within the scope of the present invention, as set forth in the following claims.

That which is claimed:

1. A method of detecting and responding to an email address harvest attack at an Internet service provider email system, comprising:
   counting a number of failed email address look-ups during a single simple mail transfer protocol session associated with an originating Internet protocol address;
   responding to the originating Internet protocol address with a positive acknowledgement that an otherwise invalid email address exists when the count of the number of failed email address look-ups exceeds a threshold;
   creating a fake email inbox for each otherwise invalid email address responded to with the positive acknowledgement, each fake email inbox having a spam folder associated therewith; and
   processing email addressed to each fake email inbox using a spam filter.

2. The method of claim 1, wherein responding to the originating IP address with the positive acknowledgement comprises:
   responding to the originating IP address with the positive acknowledgement that the otherwise invalid email address exists at a response percentage rate for subsequent failed email address look-ups responsive to the number of failed email address lookups exceeding the threshold.

3. The method of claim 2, further comprising:
   defining a plurality of email system categories ranging from a least likely to engage in an email address harvest attack to a most likely to engage in an email address harvest attack;
   determining which of the plurality of email system categories the originating Internet protocol address is associated with; and
   setting the threshold and the response percentage rate based on the email system category associated with the originating Internet protocol address.

4. The method of claim 3, wherein the threshold is less for the email system categories more likely to engage in an email address harvest attack than the threshold is for the email system categories less likely to engage in an email address harvest attack and wherein the response percentage rate is greater for the email system categories more likely to engage in an email address harvest attack than the response percentage rate is for the email system categories less likely to engage in an email address harvest attack.

5. The method of claim 1, further comprising:
   storing email addressed to each fake email inbox in the fake email inbox when the email is not determined to be spam by the spam filter; and
   storing email addressed to each fake email inbox in the respective spam folder associated therewith that is determined to be spam by the spam folder.

6. The method of claim 5, further comprising:
   generating a new spam filtering signature as a result of processing email stored in each fake email inbox;
   applying the new spam filtering signature to email directed to valid email addresses on the Internet service provider email system; and
   moving any email directed to valid email addresses on the Internet service provider email system and determined to be spam due to application of the new spam filtering signature to respective spam folders associated with the valid email addresses.

7. The method of claim 5, further comprising:
maintaining a count of email addressed to all fake email inboxes for the originating IP address;
determining if the count of email addressed to all fake email inboxes for the originating Internet protocol address exceeds a spam blocking threshold; and
blocking all communication traffic from the originating Internet protocol address when the count of email addressed to all fake email inboxes for the originating Internet protocol address exceeds a spam blocking threshold.

8. The method of claim 1, further comprising:
processing email addressed to each fake email inbox using a virus filter.

9. The method of claim 5, further comprising:
calculating a spam filtration rate for each fake email inbox by dividing a count of a number of email messages in the spam folder by a sum of the count of the number of email messages in the spam folder and a count of a number of messages in the associated fake email inbox.

10. An Internet service provider email system for detecting and responding to an email address harvest attack, comprising:
a processor; and
a memory coupled to the processor and comprising computer readable program code that when executed by the processor causes the processor to perform operations comprising:
counting a number of failed email address look-ups during a single simple mail transfer protocol session associated with an originating Internet protocol address;
responding to the originating Internet protocol address with a positive acknowledgement that an otherwise invalid email address exists when the count of the number of failed email address look-ups exceeds a threshold;
creating a fake email inbox for each otherwise invalid email address responded to with the positive acknowledgement, each fake email inbox having a spam folder associated therewith; and
processing email addressed to each fake email inbox using a spam filter.

11. The internet service provider system of claim 10, wherein responding to the originating IP address with the positive acknowledgement comprises:
responding to the originating IP address with the positive acknowledgement that the otherwise invalid email address exists at a response percentage rate for subsequent failed email address look-ups responsive to the number of failed email address lookups exceeding the threshold.

12. The Internet service provider system of claim 11, wherein the operations further comprise:
defining a plurality of email system categories ranging from a least likely to engage in an email address harvest attack to a most likely to engage in an email address harvest attack;
determining which of the plurality of email system categories the originating Internet protocol address is associated with; and
setting the threshold and the response percentage rate based on the email system category associated with the originating Internet protocol address.

13. The Internet service provider system of claim 12, wherein the threshold is less for the email system categories more likely to engage in an email address harvest attack than the threshold is for the email system categories less likely to engage in an email address harvest attack and wherein the response percentage rate is greater for the email system categories more likely to engage in an email address harvest attack than the response percentage rate is for the email system categories less likely to engage in an email address harvest attack.

14. A computer program product for detecting and responding to an email address harvest attack, comprising:
a non-transitory computer readable storage medium having computer readable program code embodied in the computer readable storage medium that when executed by a processor causes a processor to perform operations comprising:
counting a number of failed email address look-ups during a single simple mail transfer protocol session associated with an originating Internet protocol address;
responding to the originating Internet protocol address with a positive acknowledgement that an otherwise invalid email address exists when the count of the number of failed email address look-ups exceeds a threshold;
creating a fake email inbox for each otherwise invalid email address responded to with the positive acknowledgement, each fake email inbox having a spam folder associated therewith; and
processing email addressed to each fake email inbox using a spam filter.

15. The computer program product of claim 14, wherein responding to the originating IP address with the positive acknowledgement comprises:
responding to the originating IP address with the positive acknowledgement that the otherwise invalid email address exists at a response percentage rate for subsequent failed email address look-ups responsive to the number of failed email address lookups exceeding the threshold.

16. The computer program product of claim 15, wherein the operations further comprise:
defining a plurality of email system categories ranging from a least likely to engage in an email address harvest attack to a most likely to engage in an email address harvest attack;
determining which of the plurality of email system categories the originating Internet protocol address is associated with; and
setting the threshold and the response percentage rate based on the email system category associated with the originating Internet protocol address.

17. The computer program product of claim 16, wherein the threshold is less for the email system categories more likely to engage in an email address harvest attack than the threshold is for the email system categories less likely to engage in an email address harvest attack and wherein the response percentage rate is greater for the email system categories more likely to engage in an email address harvest attack than the response percentage rate is for the email system categories less likely to engage in an email address harvest attack.

* * * * *